US012779689B2

(12) United States Patent
Takeda

(10) Patent No.: US 12,779,689 B2
(45) Date of Patent: Nov. 3, 2026

(54) JOINT MECHANISM, CONTROL METHOD THEREFOR, AND STORAGE MEDIUM

(71) Applicant: TOYOTA JIDOSHA KABUSHIKI KAISHA, Toyota (JP)

(72) Inventor: Takahiro Takeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/925,525

(22) Filed: Oct. 24, 2024

(65) Prior Publication Data

US 2025/0162152 A1 May 22, 2025

(30) Foreign Application Priority Data

Nov. 16, 2023 (JP) ................................ 2023-194968

(51) Int. Cl.
*B25J 9/16* (2006.01)
*G01B 7/30* (2006.01)

(52) U.S. Cl.
CPC ........... *B25J 9/1674* (2013.01); *B25J 9/1635* (2013.01); *G01B 7/30* (2013.01)

(58) Field of Classification Search
CPC .......... G01B 7/30; B25J 9/1674; B25J 9/1635
USPC ....................................................... 318/568.1
See application file for complete search history.

(56) References Cited

U.S. PATENT DOCUMENTS

| | | | | |
|---|---|---|---|---|
| 10,201,436 | B2 * | 2/2019 | Ikedo | A61F 2/70 |
| 2003/0101838 | A1 | 6/2003 | Shinozaki | |
| 2008/0075561 | A1 * | 3/2008 | Takemura | F16F 1/025 414/800 |
| 2016/0221197 | A1 * | 8/2016 | Claffee | F16H 25/20 |
| 2017/0326737 | A1 | 11/2017 | Martin et al. | |
| 2020/0139544 | A1 * | 5/2020 | Negishi | H02P 23/00 |
| 2020/0253677 | A1 * | 8/2020 | Jinno | A61B 34/30 |
| 2021/0162602 | A1 * | 6/2021 | Kawaguchi | B25J 11/00 |

FOREIGN PATENT DOCUMENTS

| | | | |
|---|---|---|---|
| JP | H05038685 | A | 2/1993 |
| JP | 2003-170381 | A | 6/2003 |
| JP | 2017-209781 | A | 11/2017 |

* cited by examiner

*Primary Examiner* — Gabriel Agared
(74) *Attorney, Agent, or Firm* — Oliff PLC

(57) ABSTRACT

A joint mechanism includes: a first rotation shaft; a second rotation shaft; a joint portion in which the first and second rotation shafts are coupled by first, second, and third coupling members coupled in series and that transmits rotational force from the first rotation shaft to the second rotation shaft while causing the first and second rotation shafts to rotate about a pitch axis, a yaw axis, and a roll axis; a flexion angle detection unit that detects a flexion angle of the joint portion; and a control unit that controls elongation-contraction amounts of first and second elongation-contraction mechanisms such that the pitch axis, yaw axis, and roll axis of the joint portion are orthogonal to each other, based on the flexion angle of the joint portion that is detected by the flexion angle detection unit.

11 Claims, 5 Drawing Sheets

JOINT MECHANISM, CONTROL METHOD THEREFOR, AND STORAGE MEDIUM

CROSS-REFERENCE TO RELATED APPLICATION

This application claims priority to Japanese Patent Application No. 2023-194968 filed on Nov. 16, 2023, incorporated herein by reference in its entirety.

BACKGROUND

1. Technical Field

The present disclosure relates to a joint mechanism of a robot or the like, a control method therefor, and a storage medium.

2. Description of Related Art

There is known a joint mechanism including: a first rotation shaft that is disposed on a base side and that rotates by drive means; a second rotation shaft that is disposed on a distal end side and that can rotate; and a joint portion in which the first and second rotation shafts are coupled by a coupling member such as a universal joint and that transmits rotation from the first rotation shaft to the second rotation shaft while rotating about a pitch axis, a yaw axis, and a roll axis that are orthogonal to each other (for example, Japanese Unexamined Patent Application Publication No. 2003-170381).

SUMMARY

However, in the above joint mechanism, although the controllability of the rotation shafts of the joint portion is high because of the three orthogonal axes, there is a problem in that the flexion range is narrow because the joint portion is flexed by a single coupling member.

The present disclosure has been made for solving such a problem, and has a main object to provide a joint mechanism, a control method therefor, and a storage medium that make it possible to expand the flexion range of the joint portion while obtaining a high controllability of the joint portion.

An aspect of the present disclosure for achieving the above object is a joint mechanism including:

- a first rotation shaft that is disposed on a base side, the first rotation shaft being rotatable while being elongated and contracted by a first elongation-contraction mechanism;
- a second rotation shaft that is disposed on a distal end side, the second rotation shaft being rotatable while being elongated and contracted by a second elongation-contraction mechanism;
- a joint portion in which the first and second rotation shafts are coupled through the first and second elongation-contraction mechanisms respectively, by first, second, and third coupling members that are coupled in series, the joint portion transmitting rotational force from the first rotation shaft to the second rotation shaft while causing the first and second rotation shafts to rotate about a pitch axis, a yaw axis, and a roll axis;
- a flexion angle detection unit that detects a flexion angle of the joint portion; and
- a control unit that controls elongation-contraction amounts of the first and second elongation-contraction mechanisms such that the pitch axis, the yaw axis, and the roll axis of the joint portion are orthogonal to each other, based on the flexion angle of the joint portion that is detected by the flexion angle detection unit.

In this aspect:

- the flexion angle detection unit may calculate a flexion angle $\theta_0$ of the joint portion, the flexion angle $\theta_0$ of the joint portion being determined by flexion angles of the first, second, and third coupling members;
- each of distances from a flexion center O of the joint portion to end portions of the first and second rotation shafts may be represented as L; and
- the control unit may calculate the distance L based on the flexion angle $\theta_0$ of the joint portion that is calculated by the flexion angle detection unit, and a relational expression between the distance L and the flexion angle $\theta_0$, the relational expression being geometrically calculated, and may control the elongation-contraction amounts of the first and second elongation-contraction mechanisms such that each of the distances from the flexion center O of the joint portion to the end portions of the first and second rotation shafts becomes the calculated distance L.

In this aspect,

- the control unit may calculate the distance L using the following expression as the relational expression between the distance L and the flexion angle $\theta_0$, $$L = L_0 = \frac{(l_1^2 + l_2^2) + [2l_1 l_2\cos(\theta_0/3) + 2l_1 l_2\cos(2\theta_0/3) + l_1^2\cos(\theta_0) + l_2^2\cos(\theta_0/3)]}{[l_1 + l_2\cos(\theta_0/3) + l_2\cos(2\theta_0/3) + l_1\cos(\theta_0)]}$$

where, in the above expression, the joint portion is modeled as four links, lengths of the links are represented as $I_1$, $I_2$, $I_3$, and $I_4$ respectively, and $I_1=I_4$ and $I_2=I_3$ are satisfied.

In this aspect,

- the control unit may calculate the distance L using the following expression as the relational expression between the distance L and the flexion angle $\theta_0$, $$L = \frac{(l_1^2 + l_2^2 + l_3^2 + l_4^2) + 2[l_1 l_2\cos(f(\theta_0)) + l_1 l_3\cos(f(\theta_0) + \theta_2) + l_1 l_4\cos(\theta_0) + l_2 l_3\cos(\theta_2) + l_2 l_4\cos(\theta_0 - f(\theta_0) + l_3 l_4\cos(\theta_0 - f(\theta_0) - \theta_2)]}{2[l_1 + l_2\cos(f(\theta_0)) + l_3\cos(f(\theta_0) + \theta_2) + l_4\cos(\theta_0)]}$$

where, in the above expression, the joint portion is modeled as four links, lengths of the links are represented as $I_1$, $I_2$, $I_3$, and $I_4$ respectively, the flexion angles of the first, second, and third coupling members are represented as $\theta_1$, $\theta_2$, and $\theta_3$ respectively, $\theta_0=\theta_1+\theta_2+\theta_3$ is satisfied, and $f(\theta_0)$ is a previously defined function of $\theta_0$.

In this aspect,

- the control unit may calculate the distance L using the following expression as the relational expression between the distance L and the flexion angle $\theta_0$, $$L = \frac{(l_1^2 + l_2^2) + [2l_1 l_2\cos(f(\theta_0)) + 2l_1 l_2\cos(\theta_0 - f(\theta_0) + l_1^2\cos(\theta_0) + l_2^2\cos(\theta_0 - 2f(\theta_0)]}{[l_1 + l_2\cos(f(\theta_0)) + l_2\cos(\theta_0 - f(\theta_0)) + l_1\cos(\theta_0)]}$$

where, in the above expression, the joint portion is modeled as four links, lengths of the links are represented as $I_1$, $I_2$, $I_3$, and $I_4$ respectively, $I_1=I_4$ and $I_2=I_3$ are satisfied, and $f(\theta_0)$ is a previously defined function of $\theta_0$.

In this aspect, $f(\theta_0)=k\theta_0$ may be satisfied, and k may be a previously set constant.

In this aspect, the constant k=⅓ may be satisfied.

In this aspect:

the first elongation-contraction mechanism may include a slide portion that is fixed to a shaft end of the first rotation shaft, an inner circumferential shaft, a bearing that axially supports the inner circumferential shaft, a plurality of pins that is fixed to the inner circumferential shaft and that extends in an axial direction of the first rotation shaft, a holding portion that holds the bearing, and a guide portion that guides the holding portion;

guide holes may be formed in the axial direction of the first rotation shaft in the interior of the slide portion so as to correspond to the pins, the pins may extend from one end of the inner circumferential shaft in the axial direction of the first rotation shaft and may be slidably inserted into the guide holes of the slide portion, and another end of the inner circumferential shaft may be connected to the first coupling member;

the second elongation-contraction mechanism may include a slide portion that is fixed to a shaft end of the second rotation shaft, an inner circumferential shaft, a bearing that axially supports the inner circumferential shaft, a plurality of pins that is fixed to the inner circumferential shaft and that extends in an axial direction of the second rotation shaft, a holding portion that holds the bearing, and a guide portion that guides the holding portion; and guide holes may be formed in the axial direction of the second rotation shaft in the interior of the slide portion so as to correspond to the pins, the pins may extend from one end of the inner circumferential shaft in the axial direction of the second rotation shaft and may be slidably inserted into the guide holes of the slide portion, and another end of the inner circumferential shaft may be connected to the third coupling member.

In this aspect, the first, second, and third coupling members may be first, second, and third universal joints.

An aspect of the present disclosure for achieving the above object may be a control method for a joint mechanism, the joint mechanism including:

a first rotation shaft that is disposed on a base side, the first rotation shaft being rotatable while being elongated and contracted by a first elongation-contraction mechanism;

a second rotation shaft that is disposed on a distal end side, the second rotation shaft being rotatable while being elongated and contracted by a second elongation-contraction mechanism; and a joint portion in which the first and second rotation shafts are coupled through the first and second elongation-contraction mechanisms respectively, by first, second, and third coupling members that are coupled in series, the joint portion transmitting rotational force from the first rotation shaft to the second rotation shaft while causing the first and second rotation shafts to rotate about a pitch axis, a yaw axis, and a roll axis, the control method including:

a step of detecting a flexion angle of the joint portion; and a step of controlling elongation-contraction amounts of the first and second elongation-contraction mechanisms such that the pitch axis, the yaw axis, and the roll axis of the joint portion are orthogonal to each other, based on the detected flexion angle of the joint portion.

An aspect of the present disclosure for achieving the above object may be a non-transitory storage medium storing a control program for a joint mechanism, the joint mechanism including:

a first rotation shaft that is disposed on a base side, the first rotation shaft being rotatable while being elongated and contracted by a first elongation-contraction mechanism;

a second rotation shaft that is disposed on a distal end side, the second rotation shaft being rotatable while being elongated and contracted by a second elongation-contraction mechanism; and a joint portion in which the first and second rotation shafts are coupled through the first and second elongation-contraction mechanisms respectively, by first, second, and third coupling members that are coupled in series, the joint portion transmitting rotational force from the first rotation shaft to the second rotation shaft while causing the first and second rotation shafts to rotate about a pitch axis, a yaw axis, and a roll axis that are orthogonal to each other, the control program causing a computer to execute:

a process of detecting a flexion angle of the joint portion; and a process of controlling elongation-contraction amounts of the first and second elongation-contraction mechanisms such that the pitch axis, the yaw axis, and the roll axis of the joint portion are orthogonal to each other, based on the detected flexion angle of the joint portion.

The present disclosure can provide a joint mechanism, a control method therefor, and a control program therefor that make it possible to expand the flexion range of the joint portion while obtaining a high controllability of the joint portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure will be described below with embodiments of the disclosure. The disclosure according to the claims is not limited to the embodiments described below. Further, all configurations described in the embodiments are not essential as means for solving the problem.

Figure 1:
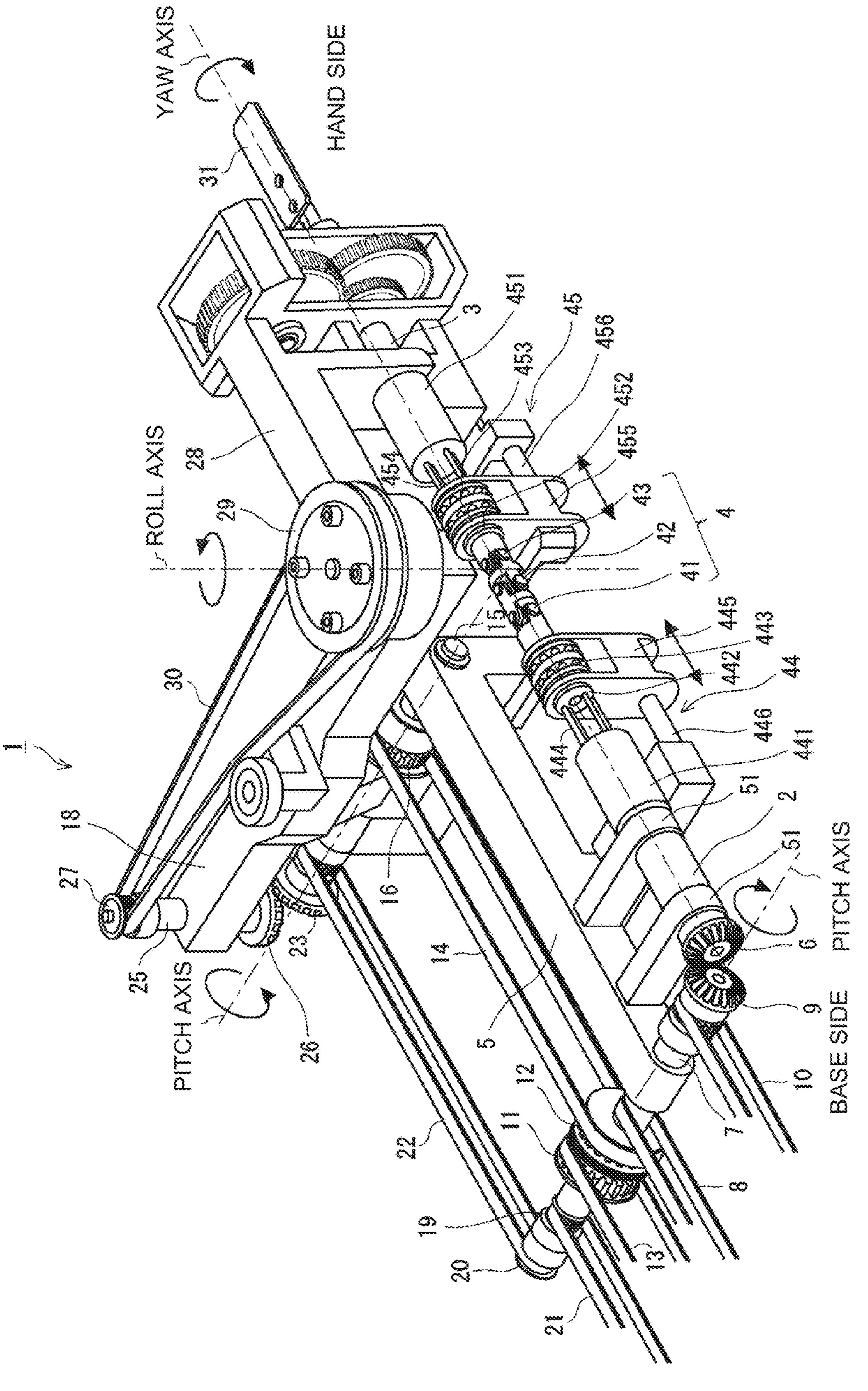
FIG. 1 is a diagram showing a schematic configuration of a manipulator according to an embodiment.
Figure 2:
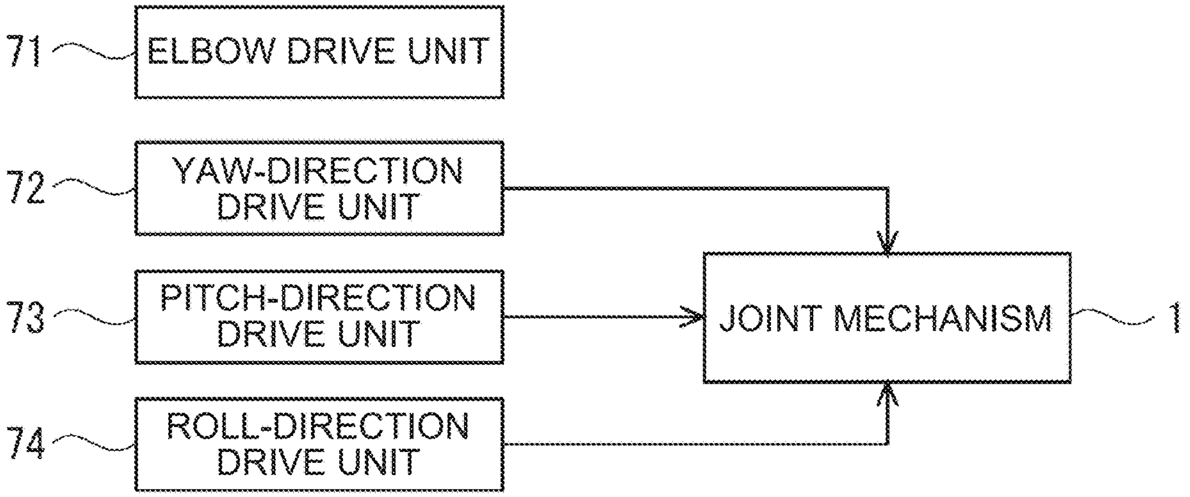
FIG. 2 is a block diagram showing a schematic system configuration of the manipulator according to the embodiment.

FIG. 1 is a diagram showing a schematic configuration of a manipulator according to an embodiment. FIG. 2 is a block diagram showing a schematic system configuration of the manipulator according to the embodiment. A joint mechanism 1 according to the embodiment is configured as a joint of a manipulator that manipulates a physical body or the like.

The joint mechanism 1 according to the embodiment includes a first rotation shaft 2 that is disposed on a base side, a second rotation shaft 3 that is disposed on a distal end side, and a wrist joint portion 4 that transmits rotational force from the first rotation shaft 2 to the second rotation shaft 3 while causing the first and second rotation shafts 2, 3 to rotate about a pitch axis, a yaw axis, and a roll axis. The wrist joint portion 4 is a specific example of the joint portion.

The first rotation shaft 2 is axially supported by a first support member 5 in a rotatable manner. A bevel gear 6 is attached to a base-side end of the first rotation shaft 2. A pair of holding portions 51 is provided on the first support member 5. The holding portions 51 axially support the first rotation shaft 2 through bearings or the like.

An elbow rotation shaft 7 is attached and fixed to a base-side end of the first support member 5. The rotation shaft 7 is a rotation shaft of an elbow joint of the manipulator. A belt 8 is wound around the elbow rotation shaft 7. The belt 8 is driven and rotated by an elbow drive unit 71. The elbow drive unit 71 is constituted by an actuator such as a motor. When the belt 8 rotates by the elbow drive unit 71, the elbow rotation shaft 7 rotates in a pitch direction, and the first support member 5 also rotates in the pitch direction.

A bevel gear 9 is attached to one end of the elbow rotation shaft 7 in a rotatable manner. A belt 10 is wound around a root of the bevel gear 9 of the elbow rotation shaft 7. The belt 10 is driven and rotated by a yaw-direction drive unit 72. The yaw-direction drive unit 72 is constituted by an actuator such as a motor. The bevel gear 9 of the elbow rotation shaft 7 engages with the bevel gear 6 of the first rotation shaft 2.

Thereby, when the belt 10 rotates by the yaw-direction drive unit 72 and thereby the bevel gear 9 of the elbow rotation shaft 7 rotates in the pitch direction, the bevel gear 6 that engages with the bevel gear 9 rotates in a yaw direction, and the first rotation shaft 2 also rotates in the yaw direction.

A pair of gears 11, 12 is attached to the elbow rotation shaft 7 in a rotatable manner. The gears 11, 12 are coupled, and integrally rotate. The pair of gears 11, 12 rotates around the elbow rotation shaft 7.

A belt 13 is wound around the one gear 11. The belt 13 is driven and rotated by a pitch-direction drive unit 73. The pitch-direction drive unit 73 is constituted by an actuator such as a motor. One end of a belt 14 is wound around the other gear 12. The other end of the belt 14 is wound around a gear 16 that is fixed to a wrist rotation shaft 15. The belt 14 may be provided with a belt tensioner for adjusting the tensile force of the belt 14.

The wrist rotation shaft 15 is axially supported by the first support member 5 through a bearing or the like, so as to be rotatable in the pitch direction. A second support portion 18 is coupled to the wrist rotation shaft 15. Thereby, when the belt 13 rotates by the pitch-direction drive unit 73 and thereby the pair of gears 11, 12 rotates in the pitch direction, the belt 14 rotates, and the wrist rotation shaft 15 and the second support portion 18 rotate in the pitch direction.

A pair of gears 19, 20 is attached to the elbow rotation shaft 7 in a rotatable manner. The pair of gears 19, 20 is coupled, and integrally rotate. The pair of gears 19, 20 rotates around the elbow rotation shaft 7. A belt 21 is wound around the one gear 19. The belt 21 is driven and rotated by a roll-direction drive unit 74. The roll-direction drive unit 74 is constituted by an actuator such as a motor.

One end of a belt 22 is wound around the other gear 20. The other end of the belt 22 is wound around a root of a bevel gear 23 that is fixed to the wrist rotation shaft 15. The belt 22 may be provided with a belt tensioner for adjusting the tensile force of the belt 22.

A rotation shaft 25 is axially supported by one end of the second support portion 18 through a bearing or the like, in a rotatable manner. A bevel gear 26 is coupled to a lower end of the rotation shaft 25. The bevel gear 26 of the rotation shaft 25 engages with the bevel gear 23 of the wrist rotation shaft 15. A gear 27 is coupled to an upper end of the rotation shaft 25.

One end of a third support portion 28 is coupled to the other end of the second support portion 18, so as to be rotatable in a roll direction. A gear 29 is attached and fixed to one end of the third support portion 28. A belt 30 is wound around the gear 27 of the rotation shaft 25 and the gear 29 of the third support portion 28. The belt 30 may be provided with a belt tensioner for adjusting the tensile force of the belt 30.

Thereby, when the belt 21 rotates by the roll-direction drive unit 74 and the pair of gears 19, 20 rotates in the pitch direction, the belt 22 rotates, and the bevel gear 23 of the wrist rotation shaft 15 rotates in the pitch direction. Then, the bevel gear 26 and the gear 27 of the rotation shaft 25 rotate, and the gear 29 of the third support portion 28 rotates in the roll direction through the belt 30.

The third support portion 28 axially supports the second rotation shaft 3 through a bear or the like in a rotatable manner. For example, an end effector that holds the physical body or the like is provided at a hand-side distal end 31 of the second rotation shaft 3.

The wrist joint portion 4 includes first, second, and third universal joints 41, 42, 43 that are coupled in series. The first, second, and third universal joints 41, 42, 43 couple the first and second rotation shafts 2, 3, and thereby, transmit the rotational force from the first rotation shaft 2 to the second rotation shaft 3 while being flexed.

In the embodiment, the first, second, and third universal joints 41, 42, 43 are specific examples of the first, second, and third coupling members. However, the first, second, and third coupling members are not limited to this, and may be other relatively rotatable coupling members such as first, second, and third rubber joints, for example.

The joint mechanism 1 is configured as described above. The pitch-direction drive unit 73 drives the belt 13, and the wrist rotation shaft 15 rotates in the pitch direction. Thereby, the first, second, and third universal joints 41, 42, 43 of the wrist joint portion 4 are flexed in the pitch direction. The roll-direction drive unit 74 drives the belt 21, and the gear 29 of the third support portion 28 rotates in the roll direction. Thereby, the first, second, and third universal joints 41, 42, 43 of the wrist joint portion 4 are flexed in the roll direction. The yaw-direction drive unit 72 drives the belt 10, and the first rotation shaft 2 rotates in the yaw direction. Thereby, the first, second, and third universal joints 41, 42, 43 of the wrist joint portion 4 rotate in the yaw direction.

As described above, the joint mechanism 1 according to the embodiment is configured to drive the roll axis and pitch axis of the wrist joint portion 4 by a serial link mechanism or a parallel link mechanism, and to drive the yaw axis of the wrist joint portion 4 by the universal joints.

For reducing the inertia of the manipulator, as described above, the actuator is disposed at the base of the manipulator, and torque is transmitted to the hand side using the above transmission mechanism. In that case, the degree of freedom of the wrist joint portion 4 is high (three degrees of freedom), and the technical difficulty level is high because the distance from the base is long. Furthermore, there are the following problems.

(1) The pitch axis, the yaw axis, and the roll axis, which are the three axes that realize the three-degree-of-freedom of the wrist joint portion 4, are desirable to be orthogonal to each other, because it is possible to facilitate the calculation for inverse kinematics and to obtain a high controllability of the wrist joint portion 4.

(2) For moving the wrist joint portion 4 similarly to a human's wrist joint portion, for example, a joint flexion range of roll "−90 deg to +70 deg", pitch "−55 deg to +25 deg", and yaw "±90 deg" is necessary. Since the robot is expected to perform tasks that are difficult for humans, it is desirable to secure a larger flexion range of the wrist joint portion 4.

In response, as shown in FIG. 1, the joint mechanism 1 according to the embodiment includes: the first rotation shaft 2 that is disposed on the base side and that can rotate while being elongated and contracted by a first elongation-contraction mechanism 44; the second rotation shaft 3 that is disposed on the distal end side and that can rotate while being elongated and contracted by a second elongation-contraction mechanism 45; and the wrist joint portion 4 in which the first and second rotation shafts 2, 3 are coupled through the first and second elongation-contraction mechanisms 44, 45 respectively, by the first, second, and third universal joints 41, 42, 43 coupled in series, and that transmits the rotational force from the first rotation shaft 2 to the second rotation shaft 3 while causing the first and second rotation shafts to rotate about the pitch axis, the yaw axis, and the roll axis, and elongation-contraction amounts of the first and second elongation-contraction mechanisms 44, 45 are controlled such that the pitch axis, yaw axis, and roll axis of the wrist joint portion 4 are orthogonal to each other, based on the flexion angle of the wrist joint portion 4.

Since the wrist joint portion 4 is constituted by the first, second, and third universal joints 41, 42, 43 that are coupled in series as described above, the flexion range of the wrist joint portion 4 can be expanded.

Meanwhile, generally, in the case where the wrist joint portion is constituted by two or more universal joints, when the roll angle and pitch angle of the wrist joint portion change, a flexion center point of the wrist joint portion also changes and cannot be kept at a constant position.

In response, as described above, the joint mechanism 1 according to the embodiment controls the elongation-contraction amounts of the first and second elongation-contraction mechanisms 44, 45 such that the pitch axis, yaw axis, and roll axis of the wrist joint portion 4 are orthogonal to each other, based on the flexion angle of the wrist joint portion 4.

Thereby, even when the roll angle and pitch angle of the wrist joint portion 4 change, the flexion center of the wrist joint portion 4 can be kept at a constant position. Accordingly, the pitch axis, yaw axis, and roll axis of the wrist joint portion 4 can be caused to be orthogonal to each other at all times, and a high controllability of the wrist joint portion 4 can be obtained. That is, it is possible to expand the flexion range of the wrist joint portion 4 while obtaining a high controllability of the wrist joint portion 4.

Figure 3:
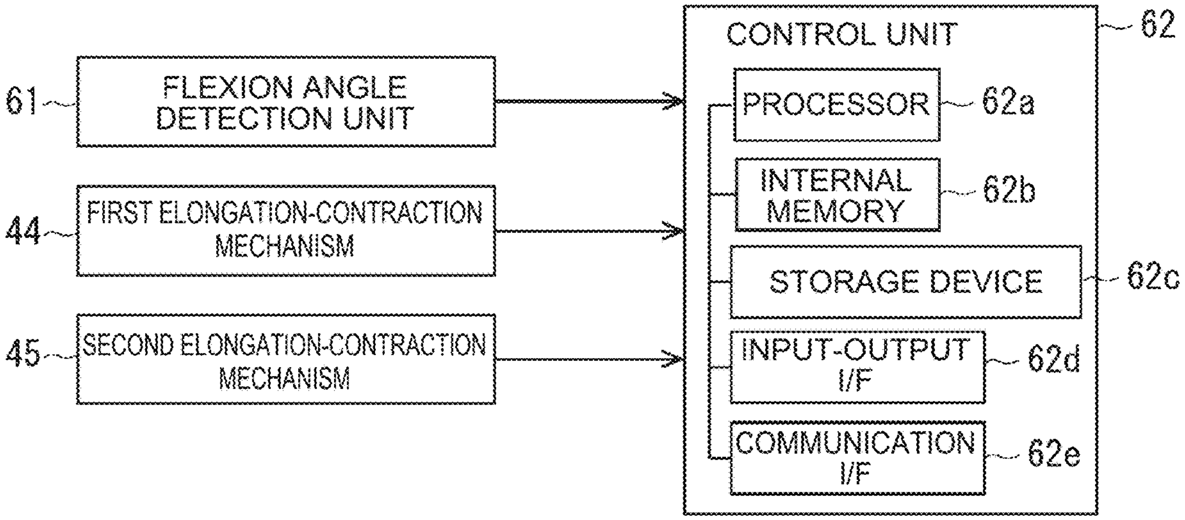
FIG. 3 is a block diagram showing a schematic system configuration of a joint mechanism according to the embodiment.

FIG. 3 is a block diagram showing a schematic system configuration of the joint mechanism according to the embodiment. The joint mechanism 1 according to the embodiment includes a flexion angle detection unit 61 that detects the flexion angle of the wrist joint portion 4, and a control unit 62 that controls the elongation-contraction amounts of the first and second elongation-contraction mechanisms 44, 45, based on the flexion angle of the wrist joint portion 4 that is detected by the flexion angle detection unit 61.

Figure 4:
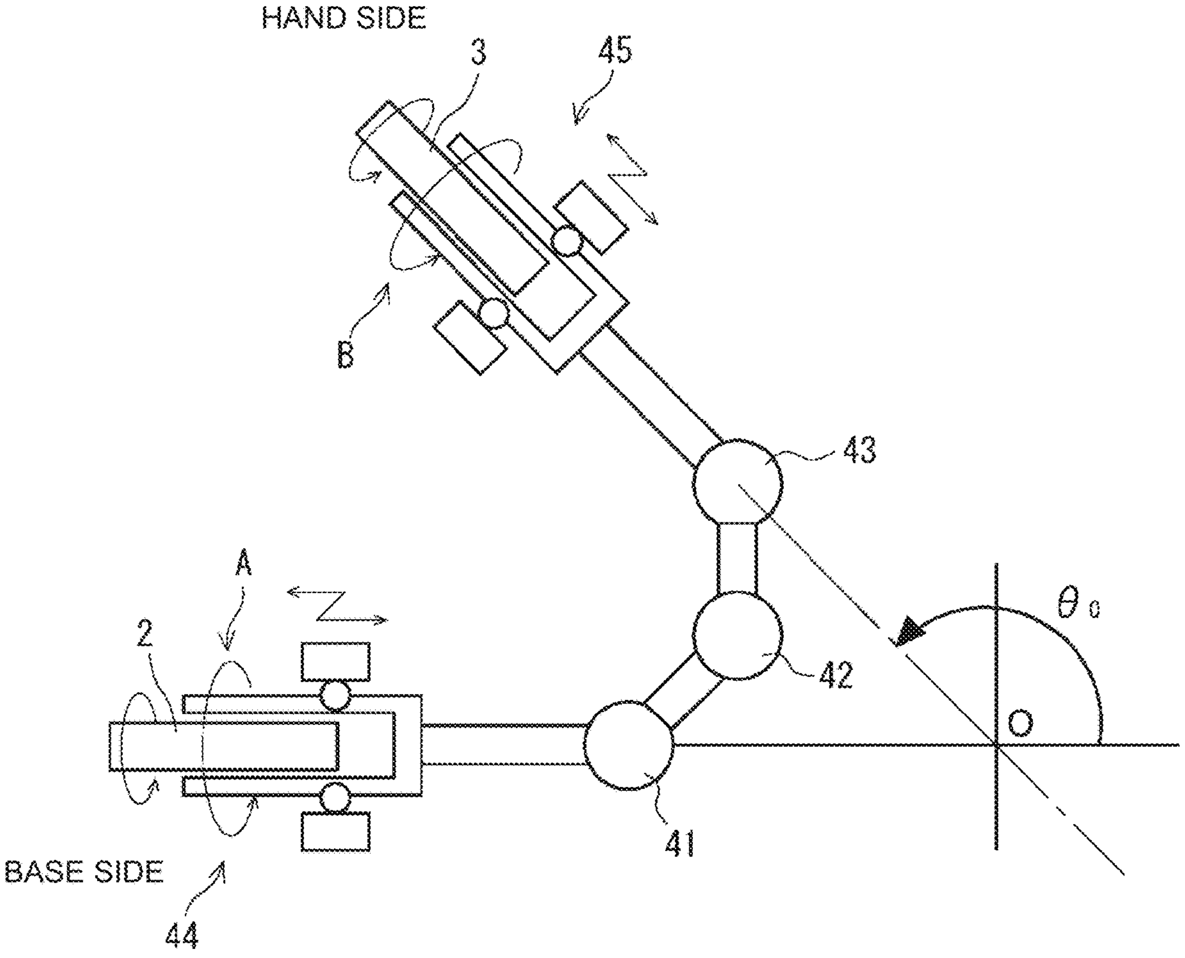
FIG. 4 is a schematic diagram of the joint mechanism according to the embodiment.

FIG. 4 is a schematic diagram of the joint mechanism according to the embodiment. The first elongation-contraction mechanism 44 is provided at a hand-side end portion of the first rotation shaft 2, and elongates and contracts the first rotation shaft 2. For example, the first elongation-contraction mechanism 44 is provided between the hand-side end portion of the first rotation shaft 2 and the first universal joint 41. The first elongation-contraction mechanism 44 is a mechanism that transmits the rotational torque of the first rotation shaft 2 to the first universal joint while elongating and contracting in the axial direction of the first rotation shaft 2.

Exemplary configurations of the first and second elongation-contraction mechanisms 44, 45 will be described in detail. For example, as shown in FIG. 1, the first elongation-contraction mechanism 44 includes a cylindrical slide portion 441 that is fixed to a shaft end of the first rotation shaft 2, an inner circumferential shaft 442, a bearing 443 that axially supports the inner circumferential shaft 442 in a rotatable manner, a plurality of pins 444 that is fixed to the inner circumferential shaft 442 and that extends in the axial direction of the first rotation shaft 2, a holding portion 445 that holds the bearing 443, and a guide portion 446 that guides the holding portion 445.

In the interior of the slide portion 441, guide holes are formed in the axial direction of the first rotation shaft 2, so as to correspond to the pins 444. The pins 444 extend from one end of the inner circumferential shaft 442 in the axial direction of the first rotation shaft 2, and are slidably inserted into the guide holes of the slide portion 441. The other end of the inner circumferential shaft 442 is connected to the first universal joint 41.

The guide portion 446 is a rod-shaped member that extends in the axial direction of the first rotation shaft 2, and is fixed to the first support member 5. The guide portion 446 is slidably inserted into a guide hole that is formed on the holding portion 445. Accordingly, the holding portion 445 is guided so as to move along the guide portion 446 in the axial direction of the first rotation shaft 2.

Since the holding portion 445 moves along the guide portion 446 in the axial direction of the first rotation shaft 2, the pins 444, the inner circumferential shaft 442, and the bearing 443 integrally move in the axial direction of the first rotation shaft 2 relative to the slide portion 441. Thereby, the first elongation-contraction mechanism 44 elongates and contracts in the axial direction of the first rotation shaft 2.

The rotational torque from the first rotation shaft 2 is transmitted to the first universal joint 41 through the slide portion 441, the pins 444, and the inner circumferential shaft 442. Accordingly, the first rotation shaft 2, the slide portion 441, the pins 444, the inner circumferential shaft 442, and the first universal joint 41 integrally rotate.

The plurality of pins 444 and the guide holes of the slide portion 441 that correspond to the pins 444 only need to have a configuration that allows the siding in the axial direction and that allows the restriction of the rotation direction, and for example, may be configured by at least a set of a (slidable) key and a keyway.

For example, the holding portion 445 may be configured to move in the axial direction of the first rotation shaft 2 by a ball screw mechanism, a wire, or the like.

In the case where the holding portion 445 is slid using the wire, wire path length changes depending on the flexion angle of the wrist joint portion 4. Therefore, it is preferable to control the wire in consideration of the change in wire path length. Further, in the case where the holding portion 445 is slid using the ball screw mechanism, hand torque (payload) does not act on the ball screw mechanism. Therefore, in the ball screw mechanism, a lightweight low-power actuator can be disposed.

Similarly to the above first elongation-contraction mechanism 44, as shown in FIG. 4, the second elongation-contraction mechanism 45 is provided at a base-side end portion of the second rotation shaft 3, and elongates and contracts the second rotation shaft 3.

For example, the second elongation-contraction mechanism 45 is provided between the base-side end portion of the second rotation shaft 3 and the third universal joint 43. The second elongation-contraction mechanism 45 is a mechanism that transmits the rotational torque of the third universal joint 43 to the second rotation shaft 3 while elongating and contracting in the axial direction of the second rotation shaft 3.

For example, as shown in FIG. 1, the second elongation-contraction mechanism 45 includes a cylindrical slide portion 451 that is fixed to a shaft end of the second rotation shaft 3, an inner circumferential shaft 452, a bearing 453 that axially supports the inner circumferential shaft 452 in a rotatable manner, a plurality of pins 454 that is fixed to the inner circumferential shaft 452 and that extends in the axial direction of the second rotation shaft 3, a holding portion 455 that holds the bearing 453, and a guide portion 456 that guides the holding portion 455.

In the interior of the slide portion 451, guide holes are formed in the axial direction of the second rotation shaft 3, so as to correspond to the pins 454. The pins 454 extend from one end of the inner circumferential shaft 452 in the axial direction of the second rotation shaft 3, and are slidably inserted into the guide holes of the slide portion 451. The other end of the inner circumferential shaft 452 is connected to the third universal joint 43.

The guide portion 456 is a rod-shaped member that extends in the axial direction of the second rotation shaft 3, and is fixed to the third support portion 28. The guide portion 456 is slidably inserted into a guide hole that is formed on the holding portion 455. Accordingly, the holding portion 455 is guided so as to move along the guide portion 456 in the axial direction of the second rotation shaft 3.

Since the holding portion 455 moves along the guide portion 456 in the axial direction of the second rotation shaft 3, the pins 454, the inner circumferential shaft 452, and the bearing 453 integrally move in the axial direction of the second rotation shaft 3 relative to the slide portion 451. Thereby, the second elongation-contraction mechanism 45 elongates and contracts in the axial direction of the second rotation shaft 3.

The rotational torque of the third universal joint 43 is transmitted to the second rotation shaft 3 through the slide portion 451, the pins 454, and the inner circumferential shaft 452. Accordingly, the third universal joint 43, the slide portion 451, the pins 454, the inner circumferential shaft 452, and the second rotation shaft 3 integrally rotate.

For example, the holding portion 455 may be configured to move in the axial direction of the second rotation shaft 3 by a ball screw mechanism, a wire, or the like.

The flexion angle detection unit 61 calculates a flexion angle $\theta_0$ of the first, second, and third universal joints 41, 42, 43, that is, a flexion angle $\theta_0$ of the wrist joint portion 4. The flexion angle detection unit 61 calculates the flexion angle $\theta_0$ of the wrist joint portion 4, based on a roll angle $\phi$ and pitch angle $\psi$ of the wrist joint portion 4, using the following expression.

$$\theta_0 = a\cos(\cos(\Phi)\cos(\Psi))$$

For example, the roll angle $\phi$ of the wrist joint portion 4 is detected by a rotation sensor provided at the gear 29 of the third support portion 28, as exemplified by an encoder. The pitch angle $\psi$ is detected by a rotation sensor provided at the wrist rotation shaft 15, as exemplified by an encoder.

For example, the control unit 62 has a hardware configuration of an ordinary computer including a processor 62*a* such as a central processing unit (CPU) and a graphics processing unit (GPU), an internal memory 62*b* such as a random-access memory (RAM) and a read-only memory (ROM), a storage device 62*c* such as a hard disk drive (HDD) and a solid state drive (SSD), an input-output I/F 62*d* for connecting peripheral equipment such as a display, and a communication I/F 62*e* for communicating with equipment in the exterior of the device.

The control unit 62 controls the elongation-contraction amounts of the first and second elongation-contraction mechanisms 44, 45 such that the pitch axis, yaw axis, and roll axis of the wrist joint portion 4 are orthogonal to each other, based on the flexion angle $\theta_0$ of the wrist joint portion 4 that is detected by the flexion angle detection unit 61.

The control unit 62 moves the holding portion 445 in the direction of the first rotation shaft 2 by controlling an actuator or the like of a ball screw mechanism or a wire take-up mechanism, and thereby, controls the elongation-contraction amount of the first elongation-contraction mechanism 44. Similarly, the control unit 62 moves the holding portion 455 in the direction of the second rotation shaft 3 by controlling an actuator or the like of a ball screw mechanism or a wire take-up mechanism, and thereby, controls the elongation-contraction amount of the second elongation-contraction mechanism 45.

A control method for the elongation-contraction amounts of the above first and second elongation-contraction mechanisms 44, 45 will be described in detail with use of FIG. 5. First, the following design conditions (1) and (2) are set.

As described above, the flexion angle $\theta_0$ of the first, second, and third universal joints 41, 42, 43, that is, the flexion angle $\theta_0$ of the wrist joint portion 4 is calculated by the roll angle $\psi$ and pitch angle $\psi$ of the wrist joint portion 4, based on a geometric relation.

$$\theta_0 = a\cos(\cos(\phi)\cos(\psi))$$

Figure 5:
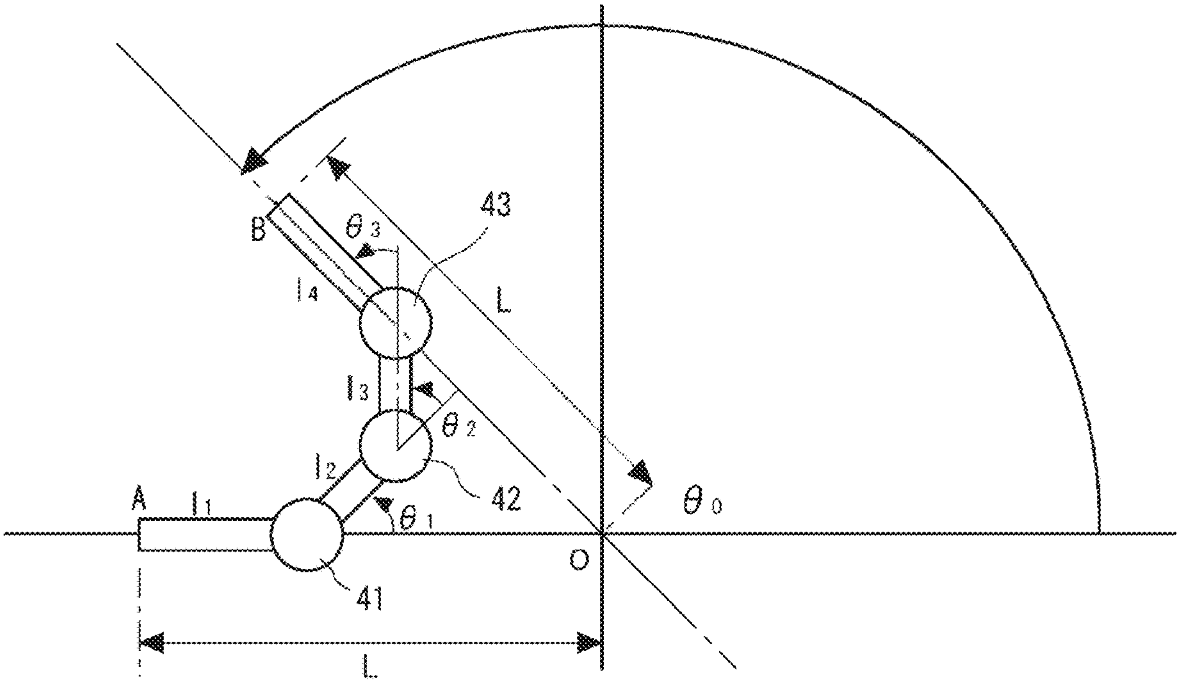
FIG. 5 is a diagram for describing a control method for elongation-contraction amounts of first and second elongation-contraction mechanisms.

(1) As shown in FIG. 5, the wrist joint portion is modeled as four links, and the lengths of the links are represented as $I_1$, $I_2$, $I_3$, and $I_4$, respectively. A base-side end of the link having the length $I_1$ is represented as A, and a hand-side end of the link having the length $I_4$ is represented as B. The link having the length $I_1$ moves on AO, and the link having the length $I_4$ moves on BO. For example, the lengths $I_1$, $I_2$, $I_3$, and $I_4$ of the links are previously set in the control unit 62, as design values.

(2) A flexion radius L of the wrist joint portion 4=OA=OB is satisfied. Each of the distances from a flexion center O of the wrist joint portion 4 to the end portions A, B of the first and second rotation shafts 2, 3 is represented as L. For example, the end portions A, B are center portions or end portions of the inner circumferential shafts 442, 452 of the first and second elongation-contraction mechanisms 44, 45. The end portions A, B may be distal end portions of the pins 444, 454 of the first and second elongation-contraction mechanisms 44, 45, or end portions of the first and third universal joints 41, 43, and may be an arbitrary portion that satisfies a relation of OA=OB, that transmits the rotational torque about the yaw axis from the first rotation shaft 2, and that slides in the axial directions of the first and second rotation shafts 2, 3.

When the flexion angles of the first, second, and third universal joints 41, 42, 43 are represented as $\theta_1$, $\theta_2$ and $\theta_3$ respectively, the flexion angle $\theta_0$ of the wrist joint portion 4=$\theta_1+\theta_2+\theta_3$ is satisfied.

When a relational expression between the flexion angles $\theta_1$, $\theta_2$, $\theta_3$ and the distance L is geometrically evaluated based on the above design conditions (1) and (2), the following expression is derived.

$$L=\frac{(l_1^2+l_2^2+l_3^2+l_4^2)+2[l_1l_2\cos(\theta_1)+l_1l_3\cos(\theta_1+\theta_2)+l_1l_4\cos(\theta_0)+l_2l_3\cos(\theta_2)+l_2l_4\cos(\theta_0-\theta_1)+l_3l_4\cos(\theta_0-\theta_1-\theta_2)]}{2[l_1+l_2\cos(\theta_1)+l_3\cos(\theta_1+\theta_2)+l_4\cos(\theta_0)]}$$

Furthermore, the following design conditions (3) to (6) are added.

(3) When $I_1=I_4$ and $I_2=I_3$ are satisfied, $\theta_1=\theta_3$ is satisfied by a geometric relation.

(4-1) The control input for the distance L is determined such that $\theta_1=f(\theta_0)$ is satisfied. Here, $f(\theta_0)$ is a previously defined function of $\theta_0$.

(4-2) $f(\theta_0)=k\times\theta_0$ is satisfied. Here, k is a previously determined parameter.

(5) When k=⅓ is satisfied, $\theta_1=\theta_2=\theta_3=\theta_0/3$ is satisfied, the angles of the first, second, and third universal joints 41, 42, 43 can be changed up to the maximum angles (for example, each maximum angle is 45°), and $\theta_0$ can be changed up to the maximum angle (for example, 135°).

(6) In the case where the angles $\theta_1$, $\theta_2$, $\theta_3$ of the first, second, and third universal joints 41, 42, 43 that serve as the premise of the expression about the control input for the distance L are different from the angles $\theta_1$, $\theta_2$, $\theta_3$ of the first, second, and third universal joints 41, 42, 43 at the time of the start of the elongation-contraction control, it is not possible to properly control the elongation-contraction amounts. In the case where the above angles are different, it is necessary to perform the adjustment for attachment. For example, when k=⅓ is satisfied, a state where $\theta_1=\theta_2=\theta_3=\theta_0/3$ is satisfied at the time of the start of the elongation-contraction control is set as the initial state, and the first, second, and third universal joints 41, 42, 43 are attached.

Based on the above derived expression and the above design conditions (3) to (6), the following relational expression between the flexion angle $\theta_0$ and the distance L can be derived. By the following expression, the distance L is uniquely determined by the flexion angle $\theta_0$.

$$L=L_0=\frac{(l_1^2+l_2^2)+[2l_1l_2\cos(\theta_0/3)+2l_1l_2\cos(2\theta_0/3)+l_1^2\cos(\theta_0)+l_2^2\cos(\theta_0/3)]}{[l_1+l_2\cos(\theta_0/3)+l_2\cos(2\theta_0/3)+l_1\cos(\theta_0)]}$$

The control unit 62 calculates the distance L based on the flexion angle $\theta_0$ of the wrist joint portion 4 that is calculated by the flexion angle detection unit 61 and the above derived relational expression between the distance L and the flexion angle $\theta_0$. The control unit 62 controls the elongation-contraction amounts of the first and second elongation-contraction mechanisms 44, 45, such that each of the distances from the flexion center O of the wrist joint portion 4 to the end portions A, B of the first and second rotation shafts 2, 3 becomes the calculated distance L.

For example, the control unit 62 calculates the positions of the above end portions A, B based on the elongation-contraction length of a ball screw of the ball screw mechanism that drives the holding portions 445, 455, or the change amount of the length of the wire, and geometrically calculates the above OA and OB from the calculated positions of the end portions A, B.

By controlling the distance L depending on the flexion angle $\theta_0$ in this way, the flexion center of the three universal joints, that is, the first, second, and third universal joints 41, 42, 43, can be kept at a constant position, and the pitch axis, yaw axis, and roll axis of the wrist joint portion 4 can be caused to be orthogonal to each other.

Instead of the above-described design conditions (1) to (6), the following design conditions (7) to (9) may be set.

(7) The link having the length $I_1$ moves on AO, and the link having the length $I_4$ moves on BO.

(8) The flexion radius L of the wrist joint portion 4=OA=OB is satisfied.

(9) The control input for the distance L is determined such that $\theta_1=f(\theta_0)$ is satisfied. Here, $f(\theta_0)$ is a previously defined function of $\theta_0$.

By the above design conditions (7) to (9), the following relational expression can be geometrically derived.

$$L=\frac{(l_1^2+l_2^2+l_3^2+l_4^2)+2[l_1l_2\cos(f(\theta_0))+l_1l_3\cos(f(\theta_0)+\theta_2)+l_1l_4\cos(\theta_0)+l_2l_3\cos(\theta_2)+l_2l_4\cos(\theta_0-f(\theta_0)+l_3l_4\cos(\theta_0-f(\theta_0)-\theta_2)]}{2[l_1+l_2\cos(f(\theta_0))+l_3\cos(f(\theta_0)+\theta_2)+l_4\cos(\theta_0)]}$$

For example, the inter-axis distance between the first and third universal joints 41, 43 may be calculated, and the angle $\theta_2$ of the second universal joint 42 may be calculated by the cosine theorem. The positions of the axes of the first and third universal joints 41, 43 are calculated based on L(t−1), $I_1$, $I_4$, and $\theta_0$. Here, L (t−1) is L at the previous time.

Further, the inter-axis distance between the first and third universal joints 41, 43 may be directly measured by a sensor such as a camera, and the angle $\theta_2$ of the second universal joint 42 may be calculated by the cosine theorem.

For example, when the angle $\theta_2$ of the second universal joint 42 is determined as described above, the control input for L is determined such that the angle $\theta_1$ of the first universal joint 41 satisfies $\theta_1=k\times\theta_0$. Here, k is a parameter that is determined in advance, and may be a constant, or may a function of $\theta_0$ ($k=f(\theta_0)$).

The control unit 62 calculates the distance L based on the above derived relational expression about the distance L. The control unit 62 controls the elongation-contraction amounts of the first and second elongation-contraction mechanisms 44, 45, such that each of the distances from the flexion center O of the wrist joint portion 4 to the end portions A, B of the first and second rotation shafts 2, 3 becomes the calculated distance L.

Furthermore, instead of the above-described design conditions (1) to (6), the following design conditions (10) to (13) may be set.

(10) The link having the length $I_1$ moves on AO, and the link having the length $I_4$ moves on BO.

(11) The flexion radius L of the wrist joint portion 4=OA=OB is satisfied.

(12) When $I_1=I_4$ and $I_2=I_3$ are satisfied, $\theta_1=\theta_3$ is satisfied by a geometric relation.

(13) The control input for the distance L is determined such that $\theta_1=f(\theta_0)$ is satisfied. Here, $f(\theta_0)$ is a previously defined function of $\theta_0$.

By the above design conditions (10) to (13), the following relational expression can be geometrically derived.

$$L = \frac{\left(l_1^2 + l_2^2\right) + [2l_1l_2\cos(f(\theta_0)) + 2l_1l_2\cos(\theta_0 - f(\theta_0) + l_1^2\cos(\theta_0) + l_2^2\cos(\theta_0 - 2f(\theta_0)]}{[l_1 + l_2\cos(f(\theta_0)) + l_2\cos(\theta_0 - f(\theta_0)) + l_1\cos(\theta_0)]}$$

The flexion angle $\theta_0$ is calculated by the roll angle $\phi$ and pitch angle $\psi$ of the wrist joint portion 4, based on a geometric relation. When one (for example, $\theta_1$) of the angles $\theta_1$, $\theta_2$, $\theta_3$ of the first, second, and third universal joints 41, 42, 43 can be determined, L is determined.

For example, the control input for L is determined such that $\theta_1=f(\theta_0)$ is satisfied about $\theta_1$. Here, $f(\theta_0)$ is a previously defined function of $\theta_0$. Furthermore, $f(\theta_0)=k\times\theta_0$ may satisfied. Here, k is a parameter that is determined in advance, and may be a constant. In the case of k=⅓, the angles $\theta_1$, $\theta_2$, $\theta_3$ of the first, second, and third universal joints 41, 42, 43 can be changed up to the maximum flection angles.

The control unit 62 calculates the distance L based on the above derived relational expression about the distance L. The control unit 62 controls the elongation-contraction amounts of the first and second elongation-contraction mechanisms 44, 45, such that each of the distances from the flexion center O of the wrist joint portion 4 to the end portions A, B of the first and second rotation shafts 2, 3 becomes the calculated distance L.

Figure 6:
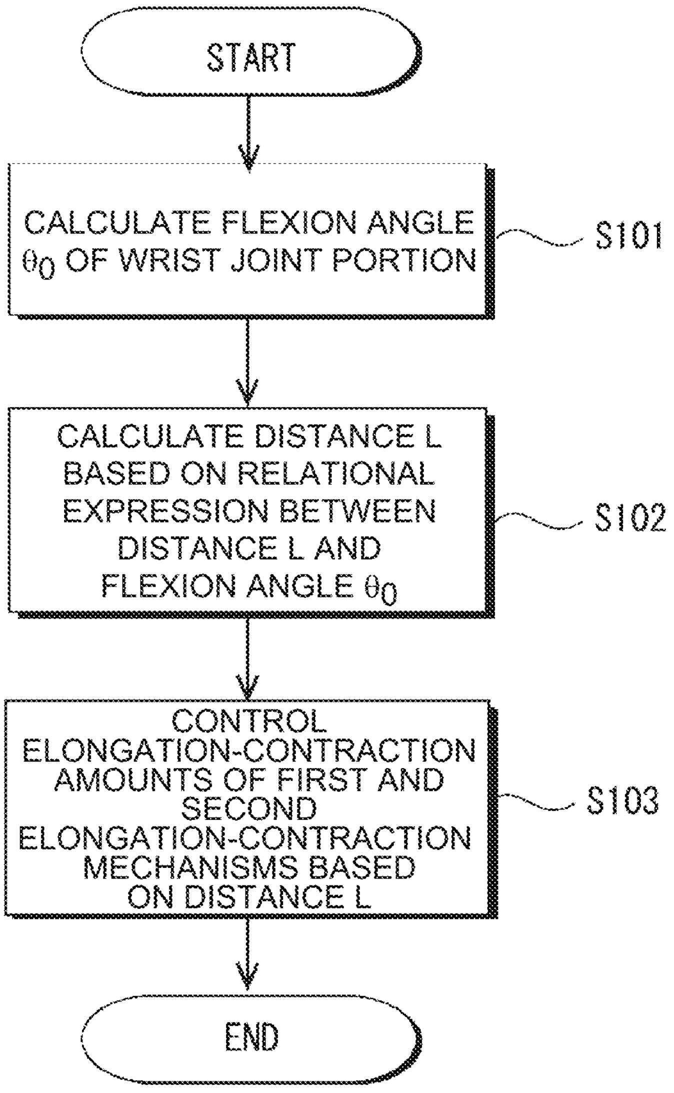
FIG. 6 is a flowchart showing a flow of a control method for the joint mechanism according to the embodiment.

Next, a control method for the joint mechanism 1 according to the embodiment will be described. FIG. 6 is a flowchart showing a flow of the control method for the joint mechanism according to the embodiment. A control process shown in FIG. 6 may be repeatedly executed at a predetermined time interval.

The flexion angle detection unit 61 calculates the flexion angle $\theta_0$ of the wrist joint portion 4 that is determined by the flexion angles of the first, second, and third universal joints 41, 42, 43 (step S101), and outputs the flexion angle $\theta_0$ to the control unit 62.

The control unit 62 calculates the distance L based on the flexion angle $\theta_0$ of the wrist joint portion 4 that is calculated by the flexion angle detection unit 61, and the relational expression between the distance L and the flexion angle $\theta_0$ (step S102).

The control unit 62 controls the elongation-contraction amounts of the first and second elongation-contraction mechanisms 44, 45, such that each of the distances from the flexion center O of the wrist joint portion 4 to the end portions A, B of the first and second rotation shafts 2, 3 becomes the calculated distance L (step S103).

As described above, the joint mechanism 1 according to the embodiment includes: the first rotation shaft 2 that is disposed on the base side and that can rotate while being elongated and contracted by the first elongation-contraction mechanism 44; the second rotation shaft 3 that is disposed on the distal end side and that can rotate while being elongated and contracted by the second elongation-contraction mechanism 45; the wrist joint portion 4 in which the first and second rotation shafts 2, 3 are coupled through the first and second elongation-contraction mechanisms 44, 45 respectively, by the first, second, and third universal joints 41, 42, 43 coupled in series, and that transmits the rotational force from the first rotation shaft 2 to the second rotation shaft 3 while causing the first and second rotation shafts to rotate about the pitch axis, the yaw axis, and the roll axis; the flexion angle detection unit 61 that detects the flexion angle of the wrist joint portion 4; and the control unit 62 that controls the elongation-contraction amounts of the first and second elongation-contraction mechanisms 44, 45 such that the pitch axis, yaw axis, and roll axis of the wrist joint portion 4 are orthogonal to each other, based on the flexion angle of the wrist joint portion 4 that is detected by the flexion angle detection unit 61.

Since the wrist joint portion 4 is constituted by the first, second, and third universal joints 41, 42, 43 coupled in series, the flexion range of the wrist joint portion 4 can be expanded. Furthermore, since the elongation-contraction amounts of the first and second elongation-contraction mechanisms 44, 45 are controlled such that the pitch axis, yaw axis, and roll axis of the wrist joint portion 4 are orthogonal to each other based on the flexion angle of the wrist joint portion 4, the pitch axis, yaw axis, and roll axis of the wrist joint portion 4 can be caused to be orthogonal to each other, and a high controllability of the wrist joint portion 4 can be obtained. That is, it is possible to expand the flexion range of the wrist joint portion 4 while obtaining a high controllability of the wrist joint portion 4.

Some embodiments of the present disclosure have been described. The embodiments have been presented as examples, and are not intended to limit the scope of the disclosure. The novel embodiments can be carried out as various other modes, and various omissions, replacements, and alterations can be performed without departing from the spirit of the disclosure. The embodiments and modifications of the embodiments are included in the scope or spirit of the disclosure, and are included in the disclosure described in the claims and a range equivalent to the disclosure.

In the present disclosure, for example, the process shown in FIG. 6 can be realized by causing a processor to execute a computer program.

The program can be stored and be supplied to a computer, using various types of non-transitory computer readable media. The non-transitory computer readable media include various types of tangible storage media. Examples of the non-transitory computer-readable media include a magnetic recording medium (for example, a flexible disk, a magnetic tape, and a hard disk drive), a magnetooptical recording medium (for example, a magnetooptical disk), a CD-Read-Only Memory (CD-ROM), a CD-R, a CD-R/W, and a semiconductor memory (for example, a mask ROM, a programmable ROM (PROM), an erasable PROM (EPROM), a flash ROM, and a random-access memory (RAM)).

The program may be supplied to the computer using various types of transitory computer readable media.

Examples of the transitory computer readable media include an electric signal, an optical signal, and an electromagnetic wave. The transitory computer readable media can supply the program to the computer through a wire communication path such as an electric wire and an optical fiber, or through a wireless communication path.

The control unit 62 according to the above embodiments is not limited to the realization by the program, and a part or whole of the control unit 62 may be realized by dedicated hardware such as an application specific integrated circuit (ASIC) and a field-programmable gate array (FPGA).

What is claimed is:

1. A joint mechanism comprising:

a first rotation shaft that is disposed on a base side, the first rotation shaft being rotatable while being elongated and contracted by a first elongation-contraction mechanism;

a second rotation shaft that is disposed on a distal end side, the second rotation shaft being rotatable while being elongated and contracted by a second elongation-contraction mechanism;

a joint portion in which the first and second rotation shafts are coupled through the first and second elongation-contraction mechanisms respectively, by first, second, and third coupling members that are coupled in series, the joint portion transmitting rotational force from the first rotation shaft to the second rotation shaft while causing the first and second rotation shafts to rotate about a pitch axis, a yaw axis, and a roll axis;

a flexion angle detection unit that detects a flexion angle of the joint portion; and a control unit that controls elongation-contraction amounts of the first and second elongation-contraction mechanisms such that the pitch axis, yaw axis, and roll axis of the joint portion are orthogonal to each other, based on the flexion angle of the joint portion that is detected by the flexion angle detection unit.

2. The joint mechanism according to claim 1, wherein:

the flexion angle detection unit calculates a flexion angle $\theta_0$ of the joint portion, the flexion angle $\theta_0$ of the joint portion being determined by flexion angles of the first, second, and third coupling members;

each of distances from a flexion center O of the joint portion to end portions of the first and second rotation shafts is represented as L; and the control unit calculates the distance L based on the flexion angle $\theta_0$ of the joint portion that is calculated by the flexion angle detection unit, and a relational expression between the distance L and the flexion angle $\theta_0$, the relational expression being geometrically calculated, and controls the elongation-contraction amounts of the first and second elongation-contraction mechanisms such that each of the distances from the flexion center O of the joint portion and to end portions of the first and second rotation shafts becomes the calculated distance L.

3. The joint mechanism according to claim 2, wherein the control unit calculates the distance L using the following expression as the relational expression between the distance L and the flexion angle $\theta_0$, $$L = L_0 = \frac{(l_1^2 + l_2^2) + \left[2l_1l_2\cos(\theta_0/3) + 2l_1l_2\cos(2\theta_0/3) + l_1^2\cos(\theta_0) + l_2^2\cos(\theta_0/3)\right]}{\left[l_1 + l_2\cos(\theta_0/3) + l_2\cos(2\theta_0/3) + l_1\cos(\theta_0)\right]}$$

where, in the above expression, the joint portion is modeled as four links, lengths of the links are represented as $I_1$, $I_2$, $I_3$, and $I_4$ respectively, and $I_1=I_4$ and $I_2=I_3$ are satisfied.

4. The joint mechanism according to claim 2, wherein the control unit calculates the distance L using the following expression as the relational expression between the distance L and the flexion angle $\theta_0$, $$L = \frac{(l_1^2 + l_2^2 + l_3^2 + l_4^2) + 2[l_1l_2\cos(f(\theta_0)) + l_1l_3\cos(f(\theta_0) + \theta_2) + l_1l_4\cos(\theta_0) + l_2l_3\cos(\theta_2) + l_2l_4\cos(\theta_0 - f(\theta_0)) + l_3l_4\cos(\theta_0 - f(\theta_0) - \theta_2)]}{2[l_1 + l_2\cos(f(\theta_0)) + l_3\cos(f(\theta_0) + \theta_2) + l_4\cos(\theta_0)]}$$

where the flexion angles of the first, second, and third coupling members are represented as $\theta_1$, $\theta_2$, and $\theta_3$ respectively, $\theta_0=\theta_1+\theta_2+\theta_3$ is satisfied, and $f(\theta_0)$ is a previously defined function of $\theta_0$.

5. The joint mechanism according to claim 2, wherein the control unit calculates the distance L using the following expression as the relational expression between the distance L and the flexion angle $\theta_0$, $$L = \frac{(l_1^2 + l_2^2) + [2l_1l_2\cos(f(\theta_0)) + 2l_1l_2\cos(\theta_0 - f(\theta_0)) + l_1^2\cos(\theta_0) + l_2^2\cos(\theta_0 - 2f(\theta_0))]}{[l_1 + l_2\cos(f(\theta_0)) + l_2\cos(\theta_0 - f(\theta_0)) + l_1\cos(\theta_0)]}$$

where, in the above expression, the joint portion is modeled as four links, lengths of the links are represented as $I_1$, $I_2$, $I_3$, and $I_4$ respectively, $I_1=I_4$ and $I_2=I_3$ are satisfied, and $f(\theta_0)$ is a previously defined function of $\theta_0$.

6. The joint mechanism according to claim 5, wherein in the expression, $f(\theta_0)=k\theta_0$ is satisfied.

7. The joint mechanism according to claim 6, wherein in the expression, k=⅓ is satisfied.

8. The joint mechanism according to claim 1, wherein:

the first elongation-contraction mechanism includes a slide portion that is fixed to a shaft end of the first rotation shaft, an inner circumferential shaft, a bearing that axially supports the inner circumferential shaft, a plurality of pins that is fixed to the inner circumferential shaft and that extends in an axial direction of the first rotation shaft, a holding portion that holds the bearing, and a guide portion that guides the holding portion;

guide holes are formed in the axial direction of the first rotation shaft in an interior of the slide portion so as to correspond to the pins, the pins extend from one end of the inner circumferential shaft in the axial direction of the first rotation shaft and are slidably inserted into the guide holes of the slide portion, and another end of the inner circumferential shaft is connected to the first coupling member;

the second elongation-contraction mechanism includes a slide portion that is fixed to a shaft end of the second rotation shaft, an inner circumferential shaft, a bearing that axially supports the inner circumferential shaft, a plurality of pins that is fixed to the inner circumferential shaft and that extends in an axial direction of the second rotation shaft, a holding portion that holds the bearing, and a guide portion that guides the holding portion; and guide holes are formed in the axial direction of the second rotation shaft in an interior of the slide portion so as to correspond to the pins, the pins extend from one end of the inner circumferential shaft in the axial direction of the second rotation shaft and are slidably inserted into the guide holes of the slide portion, and another end of the inner circumferential shaft is connected to the third coupling member.

9. The joint mechanism according to claim 1, wherein the first, second, and third coupling members are first, second, and third universal joints.

10. A control method for a joint mechanism, the joint mechanism comprising:

a first rotation shaft that is disposed on a base side, the first rotation shaft being rotatable while being elongated and contracted by a first elongation-contraction mechanism;

a second rotation shaft that is disposed on a distal end side, the second rotation shaft being rotatable while being elongated and contracted by a second elongation-contraction mechanism; and a joint portion in which the first and second rotation shafts are coupled through the first and second elongation-contraction mechanisms respectively, by first, second, and third coupling members that are coupled in series, the joint portion transmitting rotational force from the first rotation shaft to the second rotation shaft while causing the first and second rotation shafts to rotate about a pitch axis, a yaw axis, and a roll axis, the control method comprising:

a step of detecting a flexion angle of the joint portion; and a step of controlling elongation-contraction amounts of the first and second elongation-contraction mechanisms such that the pitch axis, yaw axis, and roll axis of the joint portion are orthogonal to each other, based on the detected flexion angle of the joint portion.

11. A non-transitory storage medium storing a control program for a joint mechanism, the joint mechanism comprising:

a first rotation shaft that is disposed on a base side, the first rotation shaft being rotatable while being elongated and contracted by a first elongation-contraction mechanism;

a second rotation shaft that is disposed on a distal end side, the second rotation shaft being rotatable while being elongated and contracted by a second elongation-contraction mechanism; and a joint portion in which the first and second rotation shafts are coupled through the first and second elongation-contraction mechanisms respectively, by first, second, and third coupling members that are coupled in series, the joint portion transmitting rotational force from the first rotation shaft to the second rotation shaft while causing the first and second rotation shafts to rotate about a pitch axis, a yaw axis, and a roll axis, the control program causing a computer to execute:

a process of detecting a flexion angle of the joint portion; and a process of controlling elongation-contraction amounts of the first and second elongation-contraction mechanisms such that the pitch axis, yaw axis, and roll axis of the joint portion are orthogonal to each other, based on the detected flexion angle of the joint portion.

* * * * *